(12) United States Patent
Mihál et al.

(10) Patent No.: US 9,910,514 B2
(45) Date of Patent: Mar. 6, 2018

(54) WIRELESS POSITIONING PEN WITH PRESSURE-SENSITIVE TIP

(71) Applicant: O.PEN s.r.o., Trenčín (SK)

(72) Inventors: Marek Mihál, Stěpánovice (CZ); Alexandr Mihál, Stěpánovice (CZ)

(73) Assignee: O.PEN S.R.O., Sk-Trencin (SK)

( * ) Notice: Subject to any disclaimer, the term of this patent is extended or adjusted under 35 U.S.C. 154(b) by 0 days.

(21) Appl. No.: 15/506,550

(22) PCT Filed: May 20, 2016

(86) PCT No.: PCT/IB2016/000689
§ 371 (c)(1),
(2) Date: Feb. 24, 2017

(87) PCT Pub. No.: WO2017/144936
PCT Pub. Date: Aug. 31, 2017

(65) Prior Publication Data
US 2018/0011550 A1    Jan. 11, 2018

(30) Foreign Application Priority Data
Feb. 25, 2016    (CZ) .................................... 2016-111

(51) Int. Cl.
*G06F 3/0354*    (2013.01)
*G06F 3/0346*    (2013.01)

(52) U.S. Cl.
CPC ........ *G06F 3/03545* (2013.01); *G06F 3/0346* (2013.01); *G06F 2203/0384* (2013.01)

(58) Field of Classification Search
CPC .................................................. G06F 3/03545
See application file for complete search history.

(56) References Cited

U.S. PATENT DOCUMENTS 6,627,870 B1    9/2003    Lapstun et al.
6,710,267 B2    3/2004    Natsuyama et al.
(Continued)

FOREIGN PATENT DOCUMENTS

CN        2601426 Y    1/2004
CN       203149505 U    8/2013
(Continued)

OTHER PUBLICATIONS

International Search Report dated Nov. 4, 2016 for International Application No. PCT/IB2016/000689 filed May 20, 2016.

*Primary Examiner* — Patrick F Marinelli
(74) *Attorney, Agent, or Firm* — Avery N. Goldstein; Blue Filament Law, PLLC

(57) ABSTRACT

A wireless positioning pen with a pressure-sensitive tip includes an electric power source, optical system (1), inertial sensors and wireless technology. A casing (6) has a second casing (7), and a top part with holes (61) with fingerboards (8) with buttons that forms a sliding housed body (4) with a battery (10) therein. A head (3) is attached to the front part thereof, and a first cover (5) with a fastening mechanism (51) attached to lower part of the body (4) The body (4) houses a four part printed circuit board (PCB) (2) mutually interconnected with flexible parts (20). The body (4) has the optical system (1) sliding on the PCB fixed part (14) bearing an optical sensor (13) connected through the PCB flexible part (15) to the fourth fixed part (24). The head (3) has a tip button (92) with a light source (16), and a capacitive sensor (91).

13 Claims, 15 Drawing Sheets

(56) References Cited

U.S. PATENT DOCUMENTS

| | | | |
|---|---|---|---|
| 9,116,559 B2* | 8/2015 | Valček | G06F 3/0317 |
| 2004/0140962 A1* | 7/2004 | Wang | G06F 3/0346 |
| | | | 345/179 |
| 2006/0028456 A1* | 2/2006 | Kang | G06F 3/0312 |
| | | | 345/179 |
| 2006/0109262 A1 | 5/2006 | Yeh | |
| 2007/0014490 A1 | 1/2007 | Silverbrook et al. | |
| 2007/0025805 A1 | 2/2007 | Lapstun et al. | |
| 2010/0127978 A1 | 5/2010 | Peterson | |
| 2011/0116856 A1 | 5/2011 | Lapstun et al. | |
| 2011/0310066 A1* | 12/2011 | Fermgard | B43K 8/00 |
| | | | 345/179 |
| 2013/0241898 A1* | 9/2013 | Valicek | G06F 3/0317 |
| | | | 345/179 |
| 2014/0028634 A1* | 1/2014 | Krah | G06F 3/041 |
| | | | 345/179 |
| 2015/0247743 A1 | 9/2015 | Horie et al. | |
| 2016/0018911 A1 | 1/2016 | Lan et al. | |
| 2016/0334894 A1* | 11/2016 | Fujitsuka | G06F 3/03545 |
| 2017/0308185 A1* | 10/2017 | Eguchi | G06F 3/0383 |
| 2017/0308189 A1* | 10/2017 | Peretz | G06F 3/03545 |

FOREIGN PATENT DOCUMENTS

| | | | | |
|---|---|---|---|---|
| EP | 1697876 | A1 | 9/2006 | |
| EP | 2639682 | A2 | 9/2013 | |
| EP | 2813918 | A1 | 12/2014 | |
| GB | 2500378 | A * | 9/2013 | G06F 3/03545 |
| KR | 20030017924 | A | 3/2003 | |
| SK | 5302 | Y1 | 11/2009 | |
| SK | 6147 | Y1 | 6/2012 | |
| TW | 201135537 | A | 10/2011 | |

* cited by examiner

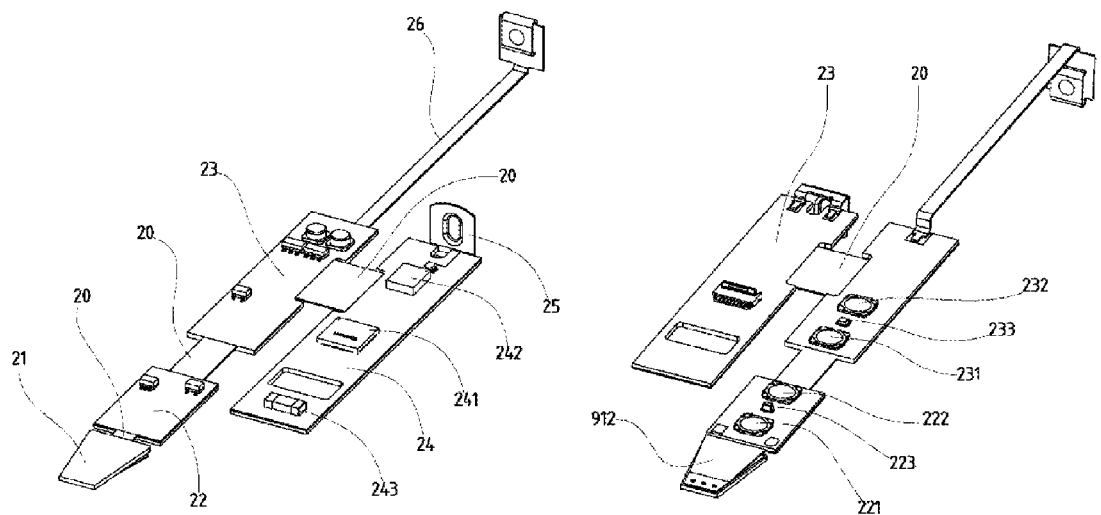
Fig. 4a
Fig. 4b
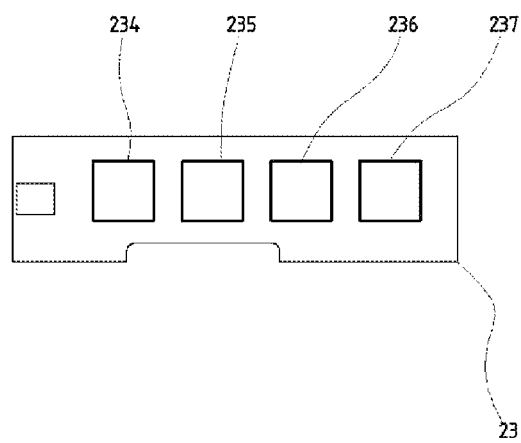
Fig. 4c (dashed line – power paths, solid lide - signal paths)

WIRELESS POSITIONING PEN WITH PRESSURE-SENSITIVE TIP

FIELD OF THE INVENTION

The present invention relates to the arrangement of a wireless positioning pen with a pressure-sensitive tip for wireless control of computers, computing devices, multimedia devices, mobile phones, tablets, and other smart devices provided with Bluetooth wireless technology or USB.

BACKGROUND OF THE INVENTION

At present, a peripheral device, the so-called "X-Y" position indicator, generally known as a "mouse", is most often used for simple and quick control of computers. Special sensors are used to transfer the motion of the position indicator onto the cursor movement on the computer monitor. A traditional mechanical-optical mouse is known, which enables to enter 2D information with the position sensor in the form of a revolving ball arranged on the bottom part of the mouse. Furthermore, the peripherals combined with a graphic display known as an "optical pen" are known. This device enables creative intervention into an image in the computer.

SK ÚV 5302 discloses a pencil-like input peripheral controller with a position sensor arranged in a longitudinal pencil-like body with a pivotable micros-switch ring above, and a secondary micro-switch button next to it. The position switch is arranged at the end of the longitudinal pencil-like body, and the primary micro-switch button is provided in the longitudinal pencil-like body next to the micro-switch rotary ring and the secondary button. In another embodiment, a head with positioning sensor is either firmly or pivotally provided at the longitudinal pencil-like body. The position sensor may be provided at the end of the longitudinal pencil-like body, and a recess, which forms at least one additional micro-switch button, may be provided under or above the pivotable micro-switch ring in the longitudinal pencil-like body.

SK ÚV 6147 discloses a multi-functional input pencil-like peripheral controller for a computer applicable for generally manufactured computers and notebooks. An electric power source is connected to a narrow longitudinal operation processor with controllers together with an output module with a functionally bidirectional independent connection, and an accelerometric sensor, optical sensor, magnetometric sensor, and gyroscopic sensor, whereas a USB module comprising an input module and performance processor with a functionally bidirectional independent connection is remotely and functionally connected to the output module, wherein the controllers consist of a primary tip button, scrolling button, secondary button, functional button, and a functional switch provided in any sequence. The controllers may consist of at least one additional button and/or a switch and/or a reverser.

EP1697876 discloses a modular unit designed for an electronic pen. The modular unit comprises a carrier with a receiver for writing, a printed circuit board, a 2D sensing radiation mounted on the printed circuit board, and a display unit that defines an image level. The carrier, printed circuit board, and display unit are interconnected with a display unit turned to the sensing radiation for searching the image level on the radiation sensor. The source of radiation, for example a LED diode or a laser diode, may be arranged on a printed circuit board or attached in a holder on the display unit. The display unit may operate as a unit for spatial control of radiation transferred onto a detector. The unit may comprise a channel for radiation transfer, imaging lenses, and a mirror for redirecting the radiation in the channel.

U.S. Pat. No. 6,710,267 discloses an input pen for a touch panel. A ball, e.g. made from acetyl bitumen, is provided on the tip of the input pen. Pen and panel touches occur via the ball, which impacts on the touch panel, and a spring system is thereby operated. The spring system comprises two springs, wherein the springs have a different spring constant. The second spring is stronger compared to the first to avoid damage to the pen when the pen touches the touch panel with greater force.

CN203149505 discloses a capacitive touch pen as an electric control device. According to the schematic representation, the capacitive touch pen comprises a casing, a stick, and a tip characterized in that the pen tip comprises an outer surface and inner surface, wherein the inner surface of the pen tip consists of elastic material, and the outer layer consists of flexible conductive material. The inner side of the pen tip consisting of conductive material includes, for example, copper, aluminium, gold, silver, and others. The utility design discloses a device for controlling PCs or mobile phones with a specific electric field.

EP2639682 discloses a position indicator for an input device, which can detect the intensity of pushing on a pen tip, and which can detect changes to pressure applied on a pen tip. The position indicator consists of a spring (i.e. the first spring body) and silicone rubber (i.e. the second spring body) sandwiched between a pair of end areas of the first ferrite core around which a coil is wound and connected to a resonance circuit, and the second ferrite core. Application of pressure on the main body part causes deformation of the silicone rubber, whereby the distance between the two opposite end areas of the first ferrite core and the second ferrite core changes in a controlled way. Changes in the pressure applied on the pen tip while pressing the pad controls the change in the distances. This results in a change in the value of the induction coil wound around the first ferrite core including an electric wave frequency being further transmitted from the resonance circuit to the detector.

EP2813918 describes an electric pen with a force sensor where the electric resistance changes with the force applied on the pen tip. The force sensor is a modular unit with an electrode and a cap arranged with each other in an electrically insulated default position. The cap, which is configured appropriately on the electrode to contact the same, is arranged to receive axial forces from the tip. The cap is also configured so that the relaxed axial forces return the cap back to the default position from the enabled position. The analogue signal from the sensor compares with a reference signal, and the selective conversion of the analogue signal into the digital force values occurs afterwards.

The disadvantages of the art particularly lie in the imperfect design of the pencil-like controller, which does not allow handling by left-handers and right-handers, writing under any angle, and controlling computer devices, mobile technologies, smart devices on the majority of types of sensed surfaces or in space.

All devices known in the art are designed to control only a specific type of a computer device.

The objective of the invention is disclosing the inventive design of the wireless positioning pen with a pressure-sensitive tip with a cylinder-like shape with a small diameter of 14 mm and a length of up to 150 mm, which enables the user to control a computer device, mobile technologies, smart devices with Bluetooth technology, or a USB feature as a support for input devices through motion on most types of sensed surfaces or spatial motion.

SUMMARY OF THE INVENTION

The disadvantages of the art are, to a substantial extent, removed by the wireless positioning pen with a pressure-sensitive tip, wherein the second cover is provided on the rear side of the casing, and the top part is provided with holes with fingerboards for buttons. Furthermore, a sliding body is arranged inside the casing with a battery inside, and a head and first cover provided with a fastening mechanism is connected to the front part and the lower part of the body, respectively. Furthermore, the body houses a printed circuit board consisting of the first fixed part, the second fixed part, the third fixed part, and the fourth fixed part interconnected to each other with flexible parts, wherein the front body part houses an optical system arranged for sliding onto the fixed part of the printed circuit board (PCB) bearing an optical sensor interconnected with the fourth fixed part through the flexible part of the printed circuit board (PCB). The head is provided with a tip button with a light source, and a capacitive sensor is housed therein.

The optical system for the wireless positioning pen with a pressure-sensitive tip consists of a holder, of which one end is configured to house optical lenses, whereas the other end is configured for sliding on the fixed part of the printed circuit board (PCB) with the optical sensor.

The head of the wireless positioning pen with a pressure-sensitive tip is provided with an expanding optical channel with one end followed by the optical lenses while the other end terminates in free space, whereas both the optical channel and the optical system are arranged coaxially with respect to the optical axis.

The fingerboards of the buttons on the wireless positioning pen with the pressure-sensitive tip have been designed as two-way fingerboards.

The first cover is demountably attached to the body of the wireless positioning pen with the pressure-sensitive tip using a means of securing, such as a screw.

The capacitive sensor on the wireless positioning pen with the pressure-sensitive tip consists of a fixed electrode built inside the first fixed part and the mobile electrode.

Connection of the wireless positioning pen with the pressure-sensitive tip, wherein the optical system is connected to the printed circuit board (PCB) is further connected with the pressure-sensitive tip, wherein the battery power supply is made through the printed circuit board (PCB).

Further connection of the wireless positioning pen with the pressure-sensitive tip, wherein the optical system comprises the light source bi-directionally signal-connected with the optical sensor.

The printed circuit board of the wireless positioning pen with the pressure-sensitive tip includes a power manager signally connected both with the first voltage inverter as well as with the second voltage inverter, wherein the power manager is further signally connected with a processor, bi-directionally signal-connected with an accelerator gyroscope module, and further bi-directionally signal-connected with an antenna. Signal-connected to the processor are the first button, the second button, the third button, and the fourth button, wherein the button is further signal-connected to the power manager.

The pressure-sensitive tip of the wireless positioning pen with the pressure-sensitive tip includes a capacitive sensor one-sidedly signal-connected with an RC oscillator that is further signal-connected with the power manager.

The powering of each electronic component of the wireless positioning pen with the pressure-sensitive tip by the power supply is provided by a battery interconnected with both the first voltage inverter and the second voltage inverter, further via the first voltage inverter with a processor, a charge pump, the optical sensor, and the RC oscillator.

The wireless positioning pen with the pressure-sensitive tip permits the user to optically position by moving the pen on the sensed surface in the X, Y axes with a rotation offset.

The wireless positioning pen with the pressure-sensitive tip permits the user to use a 3D pen motion positioning function with rotation offset and variable intensification.

The wireless positioning pen with the pressure-sensitive tip enables the user to use an image, document, website scrolling function, and similarly the pen motion (tilt) function in the up and down directions with rotation offset.

The wireless positioning pen with the pressure-sensitive tip enables the user to use an image, document, website scrolling function, and similarly the pen rolling in the longitudinal axis after gesture activation.

The wireless positioning pen with the pressure-sensitive tip enables the user to use the image, document, website scrolling function, and pen motion in the Y axis direction on the sensed surface (in the direction from/to the user).

The wireless positioning pen with the pressure-sensitive tip enables the user to use a function that provides the target device with information about a single press or double press of a button depending on the intensity of the force applied to the tip button.

The pen embodiment enables 3D space positioning without the need to install additional sensing units or cameras with a group of innovative functions in a compact design in the form of a 14 mm diameter tube. The pen can be used to precisely control various devices fitted with a USB port or Bluetooth 4.0 or better wireless technology with a USB support or Bluetooth HID class similar to a traditional computer mouse. Despite the graphic tablets, no pad is required for optical positioning. A 3D motion positioning function is available if positioning using the optical sensor is impossible for any reason. The pen has a writing mode available for improved text writing. The target devices can be controlled by motions in the space or spatial gestures in addition to the basic optical positioning. The pen is powered by a single AAA size alkaline battery, which is easily replaceable in order to continue work or entertainment.

Functionality

- Optical positioning without the need to use a special pad (optical motion)
- Positioning/controlling of the target device with pen motions in the space (3D motion) where positioning with an optical form is not feasible
- Scrolling of pages/texts by pen rolling (rolling motion)
- Gesture rolling function enabled (rolling motion)—quick rotation (jerking) in both directions along the pen's longitudinal axis
- Optical scrolling by pulling the pen (optical scrolling)
- 3D scrolling function for easy scrolling by the pen's motions in up/down directions
- Pressure sensitive tip for maximum comfort of optical positioning and writing with available use for calligraphic functions
- Customization of the pressure sensitivity of the tip
- Writing mode for more comfortable writing of text where the sensitivities of the tip button and optical sensor are adjusted.

X, Y axis position and rotation information transfer (3D output)

Calibration/correction of the coordinate system built directly into the pen.

TABLE 1

| Identification of function | Name of function | Short description |
| --- | --- | --- |
| F1 | Optical motion | X, Y axis positioning for surface pen movement |
| F2 | 3D motion | X, Y axis positioning for spatial pen movement |
| F3 | 3D scrolling | Up and down angled pen scrolling motion |
| F4 | Rolling motion | Longitudinal axis pen rolling motion |
| F5 | Optical scrolling | X axis surface pen scrolling motion |
| F6 | Pressure-sensitive tip | Surface pressure-sensitive tip pressing intensity sensing |
| CO1 | Rotation offset for Optical motion (F1) | Rotation offset along the longitudinal axis of the pen during optical positioning |
| CO2 | Rotation offset for 3D motion (F2) | Rotation offset along the longitudinal axis of the pen during spatial positioning |
| SF1 | Variable intensification | A method for eliminating small or slow deviations during spatial positioning (F2) |
| CAL1 | Pressure-sensitive tip calibration | Calibration of force intensity applied on the pressure-sensitive tip by the user |
| CAL2 | Gyroscope calibration | Gyroscope offset calibration |
| CAL3 | Perpendicular calibration | Calibration of turning towards coordinate system for the sensed surface |

DESCRIPTION OF DRAWINGS

The invention is schematically shown in the drawings, where

FIG. 4a illustrates the arrangement of each electronic component on the printed circuit board;

FIG. 4b illustrates the arrangement of each electronic component on the printed circuit board;

FIG. 4c illustrates the arrangement of the electronic components on the printed circuit board;

FIG. 5a illustrates the arrangement of the capacitive sensor electrodes;

EXAMPLES OF EMBODIMENTS

The invention will now be described in detail regarding the embodiments of the wireless positioning pen with the pressure-sensitive tip with reference to relevant drawings. The examples illustrate the unlimited embodiment variations of the positioning pen according to the invention.

Figure 1:
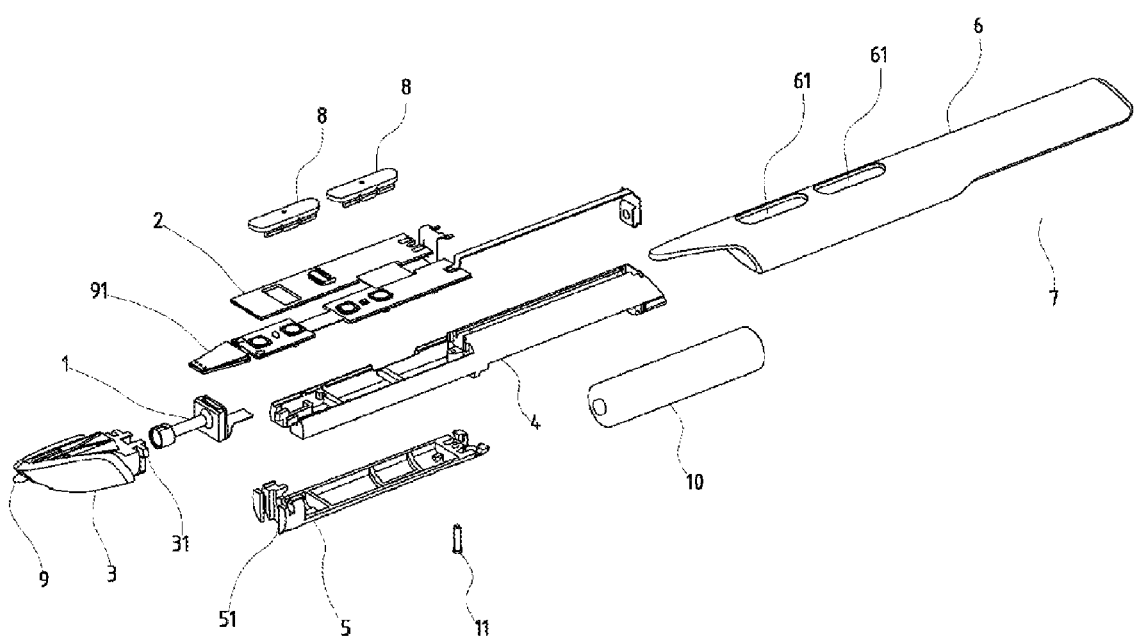
FIG. 1 illustrates the exploded view of the components of the wireless positioning pen with the pressure-sensitive tip.
Figure 2:
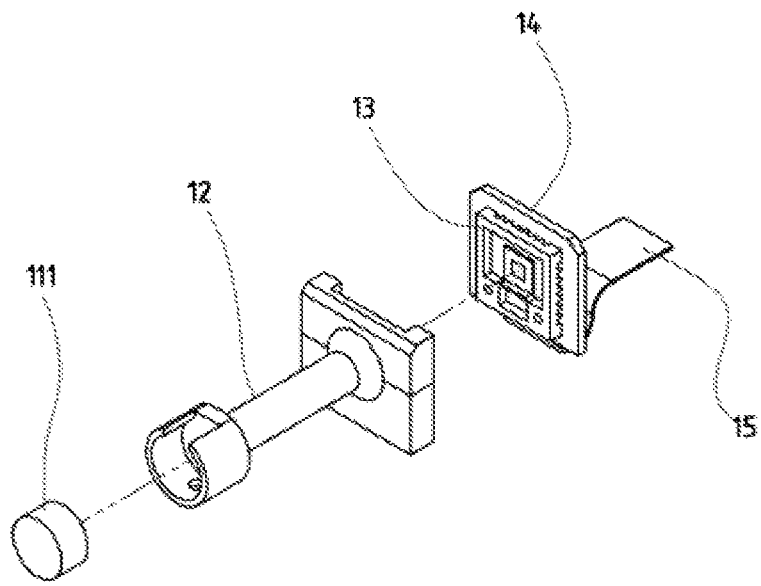
FIG. 2 illustrates the detail of the optical system.
Figure 3:
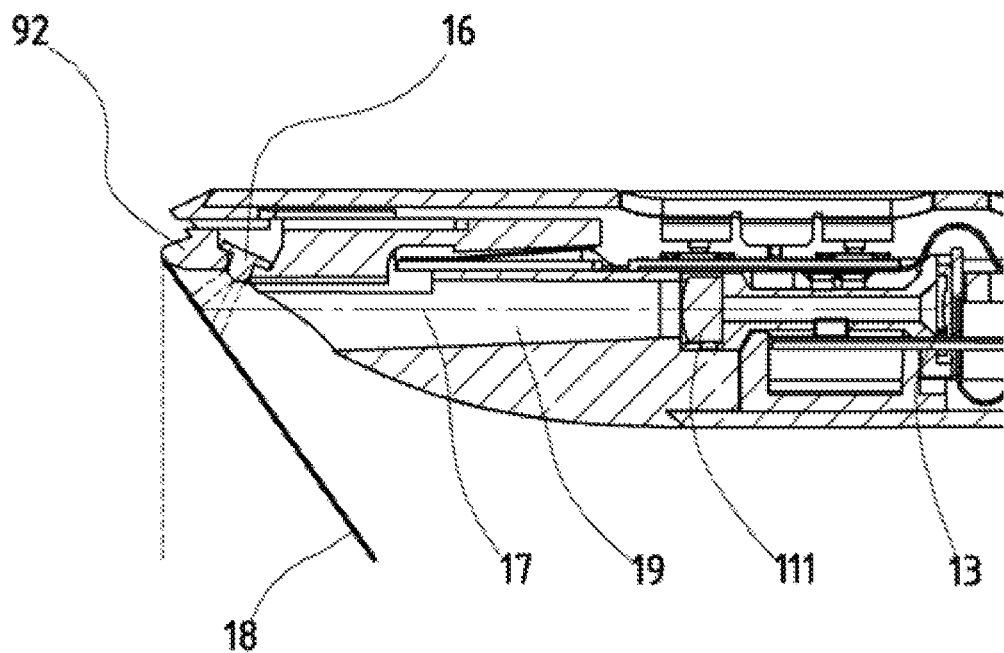
FIG. 3 illustrates the connection of the optical system to the pen head.

The example embodiment of the multi-functional pen controller with the pressure-sensitive tip is illustrated in the attached drawings. According to FIG. 1, the wireless positioning pen with the pressure-sensitive tip comprises the casing 6 with the second cover 7 for the battery 10 in the rear part. The casing 6 has either a circular or round shape being universal for comfortable handling by left-handers and right-handers. Furthermore, the casing 6 is provided on the upper part with holes 61 for placing fingerboards 8 on the buttons. The fingerboards 8 on the buttons are designed as two-way with a position that is comfortable for both left-handers and right-handers. The structure of the fingerboards 8 on the buttons enables simultaneous pressing of both positions at the same time. The casing 6 slideably houses the body 4 to which the first cover 5 is demountably attached using a fixing means 11 such as a screw. The printed circuit board (PCB) 2, consisting of four fixed parts, i.e. the first fixed part 21, the second fixed part 22, the third fixed part 23, and the fourth fixed part 24, and interconnected with flexible parts 20, is provided in the top body 4. The first cover 5 is provided with a fastening mechanism 51 in the form of a system of grooves into which the fastening members, e.g. hooks for the head 3 fastening mechanism 31 to engage, to fix the head 3 and the optical system 1. FIG. 2 illustrates the arrangement of the optical system 1. The optical system 1 is configured in the front body 4 part and consists of the holder 12, of which one end is configured to house the optical lenses 111, whereas the other end is configured for sliding on the fixed part 14 of the printed circuit board (PCB) with the optical sensor 13 connected to the fourth fixed part 24 of the printed circuit board (PCB) 2 via the PCB 2 flexible part 15. FIG. 3 illustrates the connection of the optical system 1 and the head 3. The head 3 provides the expanding optical channel 19 with one end followed by the optical lenses 111 while the other end terminates in a free space, whereas both the optical channel 19 and the optical system 1 are arranged coaxially with respect to the optical axis 17. Furthermore, the head 3 is provided with the light source 16 for illumination of the detected surface 18.

The configuration of each electronic component on the printed circuit board (PCB) 2 is illustrated in FIG. 4a, FIG. 4b, and FIG. 4c. The printed circuit board (PCB) 2 consists of the first fixed part 21, the second fixed part 22, the third fixed part 23, and the fourth fixed part 24 interconnected via flexible parts 20. The first fixed part 21 is provided with the flexible mobile electrode 912 and the fixed electrode 911 for the capacitive sensor 91 interconnected via the flexible part 20 with the second fixed part 22 provided with the first button 221, the second button 222, the LED diode 223, and the RC oscillator 94. Furthermore, the second fixed part 22 is interconnected via the flexible part 20 with the third fixed part 23 provided with the third button 231, the fourth button 232, the RGB LED diode 233, the 1.8V voltage inverter 234, the 2.4V voltage inverter 235, the power manager 236, and the charge pump 237 while the second contact 26 holder is also attached to this part. Furthermore, the third fixed part 23 is connected with the fourth fixed part 24 via the flexible part 20. The fourth fixed part 24 is provided with the processor 241 and the accelerometer gyroscope module 242, and the antenna 243 as well as the first contact 25.

Figure 5:
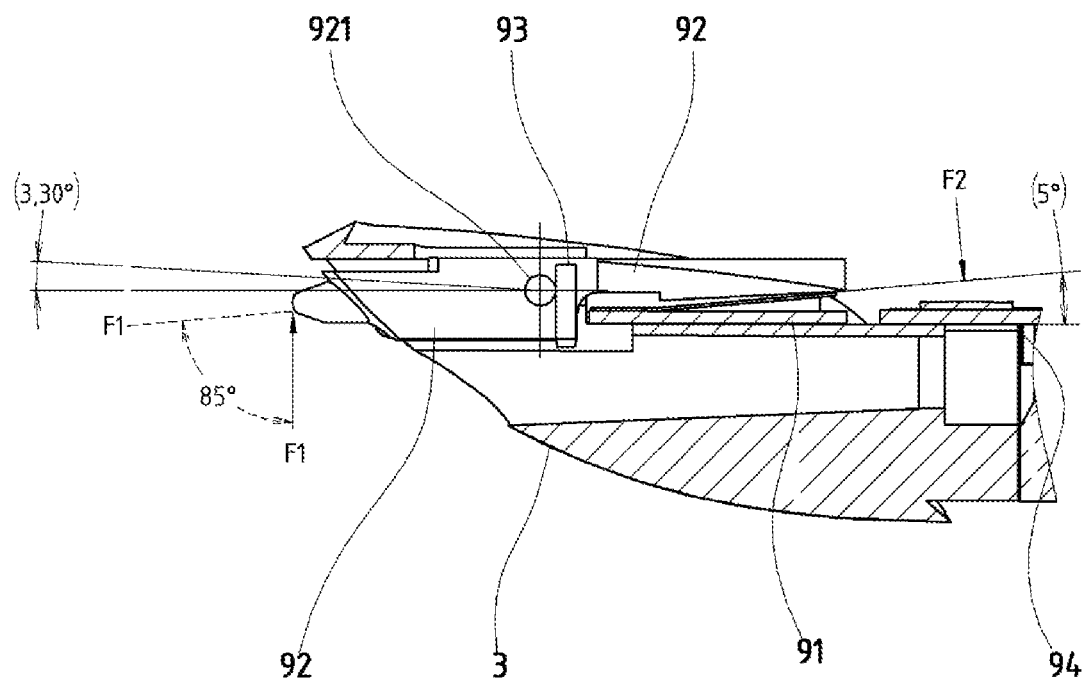
FIG. 5 illustrates the arrangement of the pressure-sensitive tip that is part of the wireless positioning pen with the pressure-sensitive tip.
Figure 5:
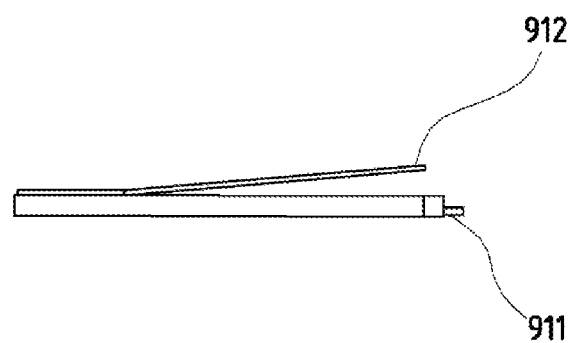

FIG. 5 illustrates the configuration of the pressure-sensitive tip 9 as a part of the wireless positioning pen with a pressure-sensitive tip. In this embodiment, the pressure-sensitive tip includes the head 3 connected to the other pen components as described above. The tip button 92, the rotary around rotation axis 921 and leaning on the plug 93, is provided in the head 3. The tip button 92 body is made as a two-armed level where one arm applies F2 force on the flexible mobile electrode 912 for the capacitive sensor 91 at a 5° angle, whereas the other arm in the form of a cone is under force F1, and the arm makes a swinging movement in a 3.3° angle. Applying force F1 onto the tip button 92 cone at an approximate angle of 85° fully towards the perpendicular plane of the longitudinal pen axis makes the tip button 92 revolve around tip rotation axis 921 and transfers force F2 via the tip button 92 arm onto the flexible mobile electrode 912 (e.g. metal silver-coated phosphorus-bronze flexible metal sheet), which is a part of the printed circuit board 2 and which changes its electrical capacity due to approaching or departing of the flexible mobile electrode 912 to the fixed electrode 911. Detuning of the frequency of the attached RC oscillator 94 occurs depending on the change, wherein the said frequency is transformed by the analogue-digital converter built into processor 241 into the digital signal, and processor 241 filters and evaluates the digital signal using the appropriate software. Processor 241 executes the F6 Pressure-sensitive tip user function based on the results from the evaluation of the digital signal. The device is provided with CRL3 user calibration to correctly evaluate the signal from the F6 Pressure-sensitive tip function.

General processing of signals from the accelerometer gyroscope module 242 is described below.

The signals are processed in all user modes (functions), see Table 1.

Raw data $(\overrightarrow{a_{raw}}, \overrightarrow{\omega_{raw}})$ from the accelerometer gyroscope module 242 is transferred from the coordinate system for the sensors to the coordinate system for the pen.

$$\overrightarrow{a_S} = \begin{bmatrix} a_{Sx} \\ a_{Sy} \\ a_{Sz} \end{bmatrix} = A_A \cdot \overrightarrow{a_{raw}} = \begin{bmatrix} 0 & -1 & 0 \\ 0 & 0 & 1 \\ 1 & 0 & 0 \end{bmatrix} \cdot \begin{bmatrix} a_{xraw} \\ a_{yraw} \\ a_{zraw} \end{bmatrix},$$

$$\overrightarrow{\omega_S} = \begin{bmatrix} \omega_{Sx} \\ \omega_{Sy} \\ \omega_{Sz} \end{bmatrix} = A_G \cdot \overrightarrow{\omega_{raw}} = \begin{bmatrix} 0 & 0 & -1 \\ 0 & -1 & 0 \\ -1 & 0 & 0 \end{bmatrix} \cdot \begin{bmatrix} \omega_{xraw} \\ \omega_{yraw} \\ \omega_{zraw} \end{bmatrix}.$$

The coordinate systems for acceleration and angular velocity are different intentionally. The acceleration system is selected to allow rotation offset CO1 for optical motion as well as rotation offset CO2 for 3D motion in the longitudinal pen axis according to X, Y components.

The X, Y, Z system for the gyroscope is selected in the accelerometer gyroscope module 242 so that X, Y components correspond to the motion in the F2 3D motion mode, and the Z axis is reserved for rolling.

The first order IIR filter is used to filter the acceleration according to the following formula:

$$\overrightarrow{a}(n) = 0.9 \cdot \overrightarrow{a}(n-1) + 0.1 \cdot \overrightarrow{a_s}(n),$$

with the time period $t_n$=15 ms, which exactly corresponds to the frequency of posting the position HID reports.

Acceleration filtration improves noise resistance and causes a slight phase delay with respect to angular velocities from which the accelerometer gyroscope module 242 offsets gained by CRL2 calibration are deducted. This is particularly manifested in fast motions in the F2 3D motion mode.

The offsets are deducted from the angular velocities as follows:

$$\overrightarrow{\omega} = \begin{bmatrix} \omega_x \\ \omega_y \\ \omega_z \end{bmatrix} = \overrightarrow{\omega_S} - \overrightarrow{\omega_{offset}} = \begin{bmatrix} \omega_{Sx} \\ \omega_{Sy} \\ \omega_{Sz} \end{bmatrix} - \begin{bmatrix} \omega_{offsetx} \\ \omega_{offsety} \\ \omega_{offsetz} \end{bmatrix}.$$

F1 Optical Motion User Function

The F1 Optical Motion function has been designed and used for optical X, Y axis positioning for surface 18 pen motion. Similarly to a traditional pen, the user causes cursor movement through the pen motions on the detected surface 18 of the target controlled device in the X, Y axes. The F1 optical motion function is automatically enabled after switching on the device by pressing the fourth button 232 and connecting to the target controlled device. The F5 optical scrolling function is enabled by pressing the first button 221. Pressing the second button 222 submits information about pressing the secondary button to the target controlled device in the manner well known for a standard computer mouse. Intermittent lighting of the LED diode 223 provides optical signalling for the enabled function.

When processing data from the optical sensor 13, the CO1 rotation offset for the optical motion methods are applied with respect to the pen longitudinal axis and CAL3 perpendicular calibration with respect to the detected surface 18. Furthermore, the positioning interruption methods are applied depending on the F6 pressure-sensitive tip 9.

Figure 8:
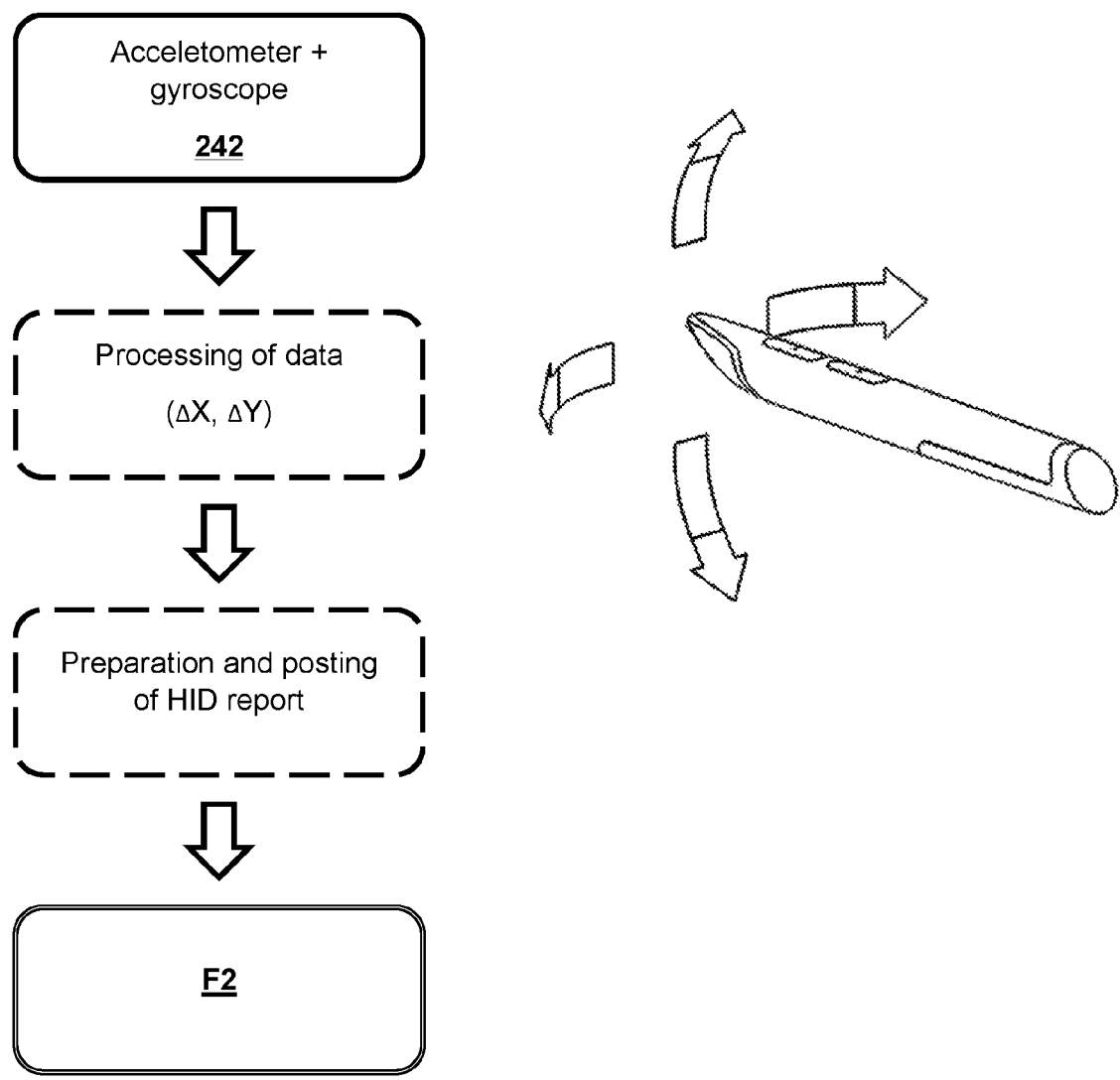
FIG. 8 illustrates the F2 function, i.e. X, Y axis positioning function for the spatial pen motion.

The steps of the F1 optical motion function are illustrated in FIG. 8.

Data is processed as follows:

$$\overrightarrow{r} = R \cdot A \cdot \Delta \overrightarrow{o},$$

where $$\overrightarrow{r} = \begin{bmatrix} \Delta x \\ \Delta y \end{bmatrix}$$

is a relative change to the position submitted in the HID report $$\Delta \vec{o} = \begin{bmatrix} \Delta o_x \\ \Delta o_y \end{bmatrix}$$

is a relative change to a pad position as seen by the optical sensor 13
R is an offset matrix for CO1 rotation offset for the optical motion
A is a calibration matrix specified during CAL3 perpendicular calibration.

F2 User Function—3D Motion

The F2 3D Motion function is designed for 3D spatial pen motion. When the user hits a detected surface that is 18 not suitable for the optical sensor 13, e.g. glass etc. or for any reason, the user may position the cursor using the spatial pen motions. The F2 3D Motion function is enabled by pressing the fourth button 232. When the button 221 is pressed, the tilting of the wireless positioning pen with press sensitive tip upwards or downwards translates the motions to the Y axis motion movement of the cursor of the target controlled devices, and tilting to the right or left translates the motions to the X axis motion movement of the cursor of the target controlled devices including any combinations thereof. Pressing or releasing the second button 222 submits the information (HID report) on the status of the primary button to the target controlled device in the manner well-known for a standard computer mouse. When the first button 221 and the second button 222 are pressed simultaneously, positioning and submitting of information about pressing the primary button occurs at the same time in the manner known for a standard computer mouse, whereby the user may launch the drag and drop function, if available, on the target controlled device. While actively positioning, the second button 222 may be additionally pressed and released due to the design of the fingerboards 8 on the buttons. Pressing the second button 231 submits information about pressing the secondary button to the target controlled device in the manner well-known for a standard computer mouse. Intermitted lighting of the RGB LED diode 233 provides optical signalling for the enabled function.

Figure 13:
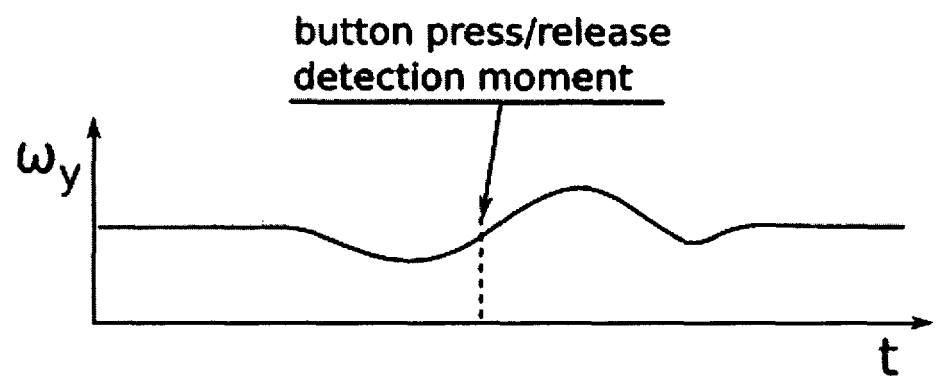
FIG. 13 illustrates pen vibrations when pressing/releasing the first button.

The CO2 rotation offset methods apply during data processing for 3D motion with respect to the pen's longitudinal axis and the SF1 variable intensification method. Pressing and holding the first button 221 enables to position or respond to the pen motion in a 3D space. On the contrary, positioning is interrupted when the first button 221 is released. The pen vibrates when the first button 221 is either pressed or released, and said vibration translates unfavourably to the cursor position on the target controlled device. These unfavourable conditions have been resolved individually as follows. The start of the positioning is delayed by 200 ms when the first button 221 is pressed. Suppression of the pen vibrations with release of the first button 221 is managed by submitting the HID report -.DELTA.x, -.DELTA.y, where .DELTA.x, .DELTA.y are the position values from the previous HID report because when the first button 221 is released, the vibrations occur before the first button 221 status is detected (pressed/released)—as illustrated in FIG. 13.

FIG. 8 illustrates each step of the F2 3D Motion function.
Data is processed as follows:

$$\vec{e} = G \cdot \vec{\omega},$$

$$\vec{r} = g(|\vec{e}|) \cdot \vec{e},$$

where $$\vec{r} = \begin{bmatrix} \Delta x \\ \Delta y \end{bmatrix}$$

is the relative change in the position submitted in the HID report
$\vec{\omega}$ is the angular velocity vector measured by accelerometer gyroscope module 242
G is the CO2 offset matrix for 3D motion
g is SF1 variable intensification $$\vec{e} = \begin{bmatrix} e_x \\ e_y \end{bmatrix}$$

is the intermediate result—non-intensified change in position

F3 User Function—3D Scrolling

The F3 3D scrolling function scrolls the image, document, website etc. by moving (tilting) the pen up or down.

The F3 3D scrolling function is enabled by a sequence of pressing, releasing, and holding the first button 221. From the moment when the first button 221 is permanently pressed, the image scrolls by the motion of tilting the pen upwards or downwards. The function ends upon releasing the first button 221. The pen vibrations due to pressing or releasing the first button 221 have no unfavourable impacts in the form of unintentional scrolling because their amplitude is usually lower than the one-line scrolling threshold. Intermitted lighting of RGB LED diode 223 provides optical signalling for the enabled function.

The CO2 rotation offset applies during data processing for the 3D motion with respect to the longitudinal pen axis identically to the F2 3D motion function with slightly different parameters. Information about the X axis is discarded and the Y axis information is used.

Figure 9:
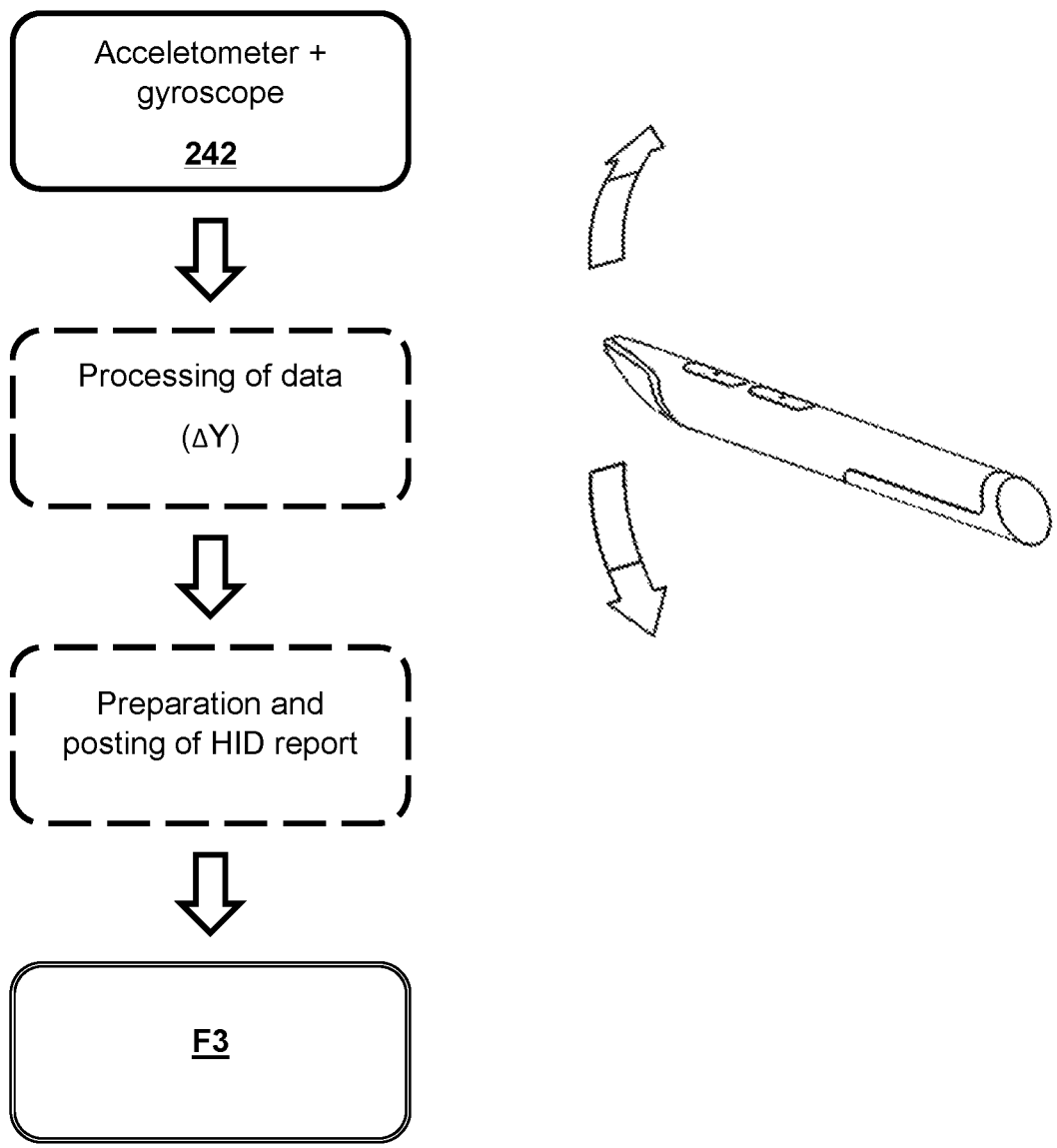
FIG. 9 illustrates the F3 function, i.e. up and down angled pen scrolling motion function.

FIG. 9 illustrates each step of the F3 3D Scrolling function.
Data is processed as follows:

$$\vec{e} = G \cdot \vec{\omega},$$

$$\Delta scroll = h(e_y) \cdot e_y,$$

where
$\Delta scroll$ is the number of lines for scrolling submitted in the HID report on scrolling/buttons
$\vec{\omega}$ is the angular velocity vector measured by gyroscope
G is the CO2 offset matrix for 3D motion
h is the SF1 variable intensification of scrolling $$\vec{e} = \begin{bmatrix} e_x \\ e_y \end{bmatrix}$$

is the intermediate result—non-intensified change of position

F4 User Function—Rolling Motion

The F4 rolling motion function is designed for scrolling an image, document, website and more by rolling the pen in a longitudinal axis.

Figure 14:
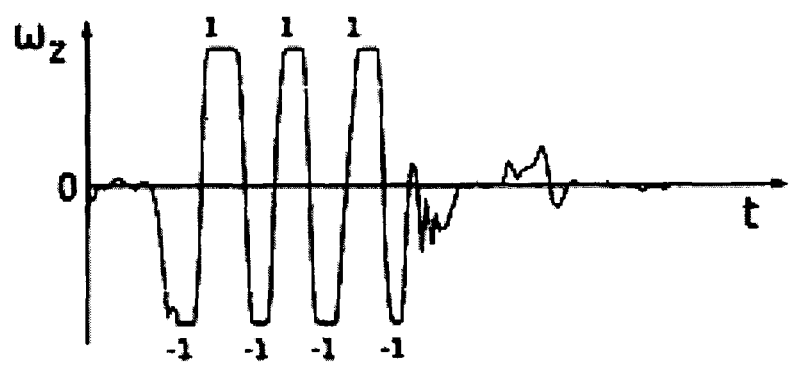
FIG. 14 illustrates a course of the angular velocity in the pen longitudinal axis (Z)

The F4 rolling motion function is enabled by a gesture in the form of quick pivoting of the pen in the longitudinal axis several times to one side and back. FIG. 14 illustrates an example course of the angular velocity in the pen longitudinal axis (Z).

The detection algorithm records the moment with angular velocity over either a positive or a negative threshold—0.8 of the maximum range. When the threshold value is exceeded, the angular velocity polarity and current time are stored in a circular buffer for the length of eight samples. The gesture is recognized when the buffer holds an alternating sequence of −1 and 1 with a length of at least four samples with a time spacing of 2.4 seconds "from the oldest to the youngest". Intermitted lighting of the RGB LED diode 233 provides optical signalling of the enabled function.

No CO2 rotation offset for 3D motion applies here for data processing; only the SF1 variable intensification with different parameters is applied.

Figure 10:
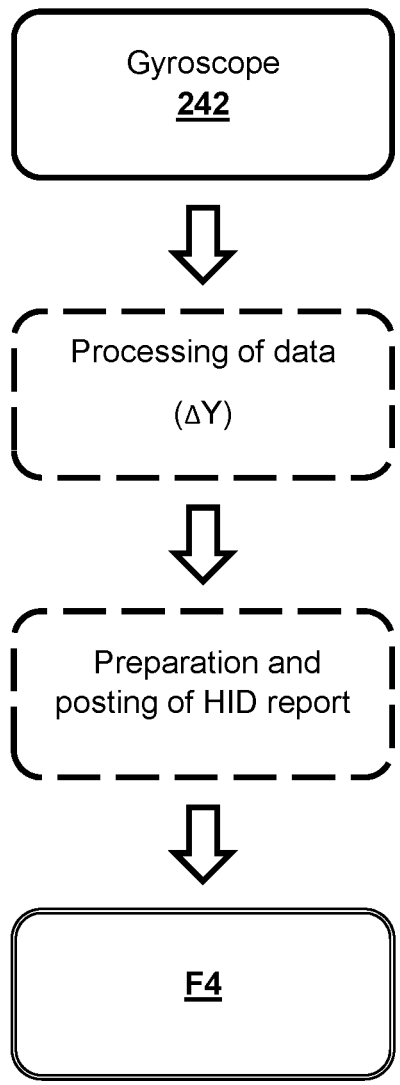
FIG. 10 illustrates the F4 function, i.e. longitudinal axis pen rolling motion function.
Figure 10:
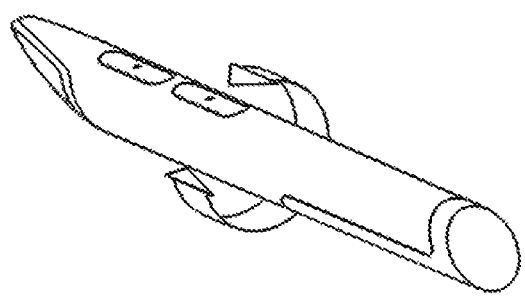

FIG. 10 illustrates each step of the F4 Rolling Motion function.

Data is processed as follows:

$$\Delta scroll = j(\omega_z) \cdot \omega_z,$$

where
$\Delta scroll$ is the number of lines for scrolling submitted in the HID report on scrolling/buttons
$\omega_z$ is the Z component of angular velocity vector $\vec{\omega}$ measured by gyroscope.
j is the SF1 variable intensification of image scrolling.

F5 User Function—Optical Scrolling

The F5 optical scrolling function is designed for scrolling an image, document, website and more by the pen motion on a detected surface in the Y axis (from user and to user).

The F5 optical scrolling function is enabled upon pressing and holding the first button 221 during the F1 optical motion function. The image scrolls by motion on the detected surface 18 from the user or to the user. When the first button 221 is released, the F5 optical scrolling function is disabled and the F1 optical motion function is enabled. The pen motion from the user or to the user is configured in the ratio of 10 pixels ($\Delta y$)/1 line.

When processing data from the optical sensor 13, the CO1 rotation offset for the F1 optical motion function methods are applied with respect to the pen longitudinal axis and the CAL3 perpendicular calibration with respect to the detected surface 18.

Figure 11:
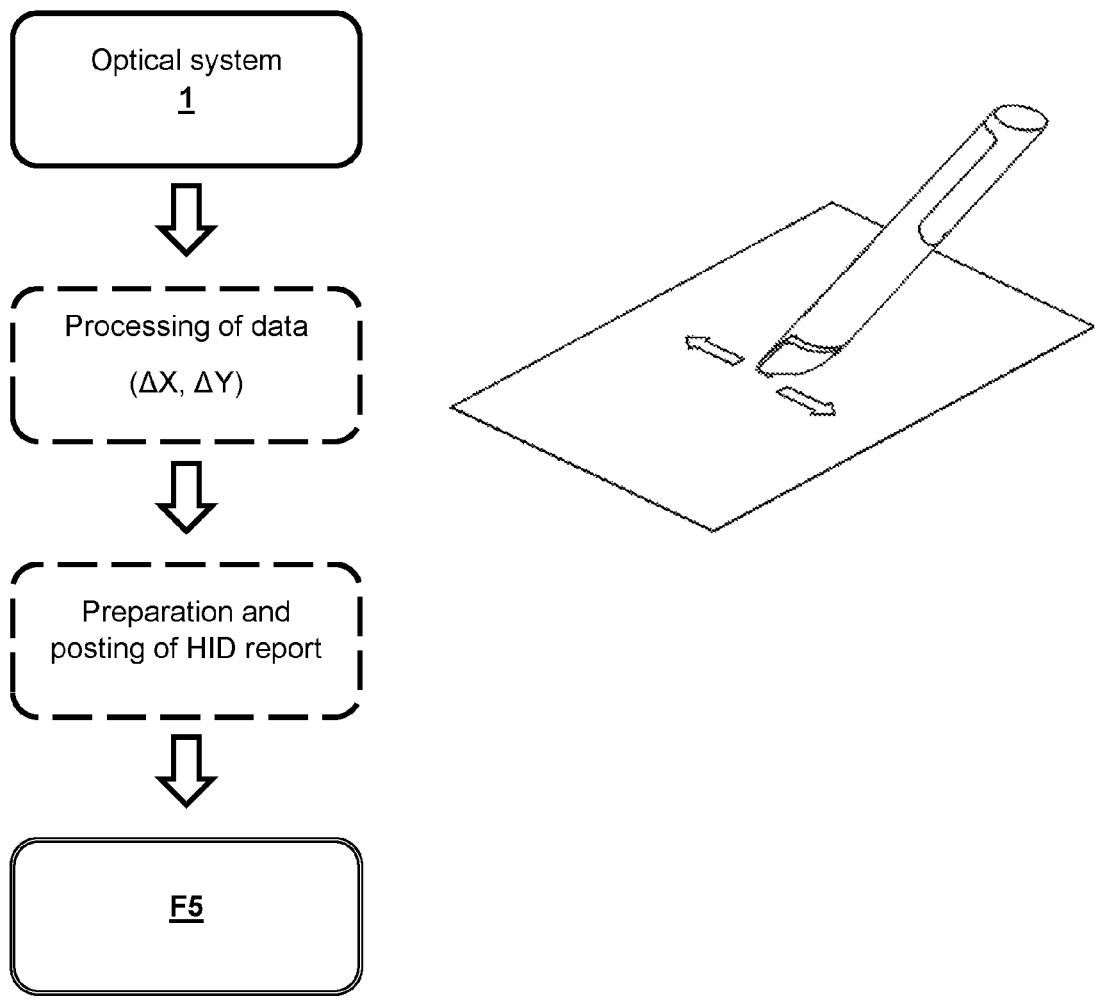
FIG. 11 illustrates the F'S function, i.e. X axis surface pen scrolling motion function.

FIG. 11 illustrates each step of the F'S optical scrolling function.

Processing of Data:

$$\vec{e} = R \cdot A \cdot \Delta \vec{o},$$

$$\Delta scroll = \frac{e_y}{10},$$

where
$\Delta scroll$ is the number of lines for scrolling submitted in the HID report on scrolling/buttons $$\Delta \vec{o} = \begin{bmatrix} \Delta o_x \\ \Delta o_y \end{bmatrix}$$

is the relative change to a pad position as seen by the optical sensor 13
R is an offset matrix for CO1 rotation offset for the optical motion A is the calibration matrix specified during CAL3 perpendicular calibration $$\vec{e} = \begin{bmatrix} e_x \\ e_y \end{bmatrix}$$

is the intermediate result—change in position.

F6 User Function—Pressure-Sensitive Tip

Figure 12:
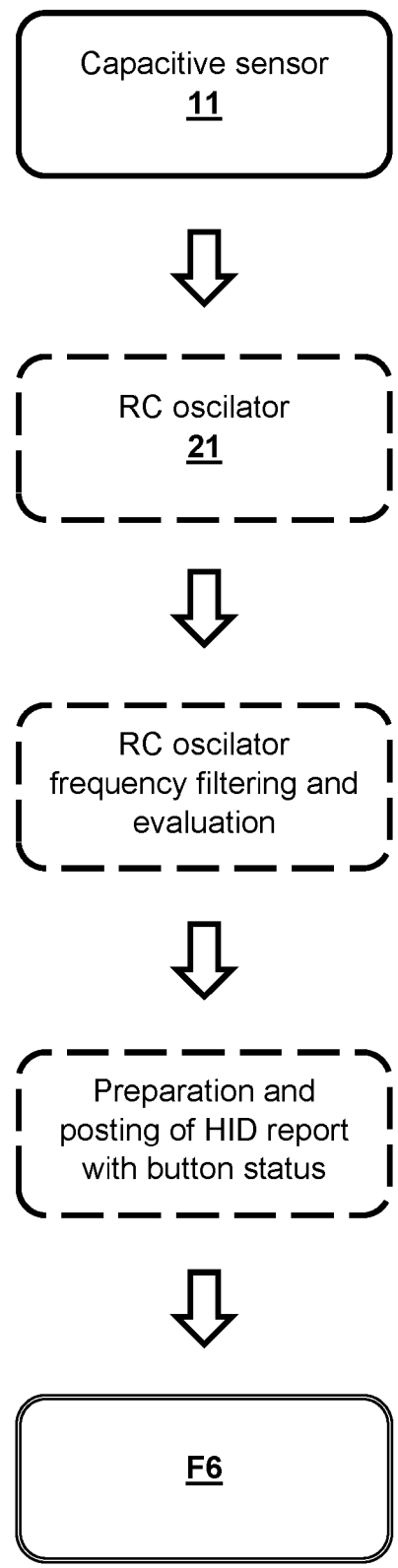
FIG. 12 illustrates the F6 function, i.e. surface pressure-sensitive tip pressing intensity sensing function.
Figure 15:
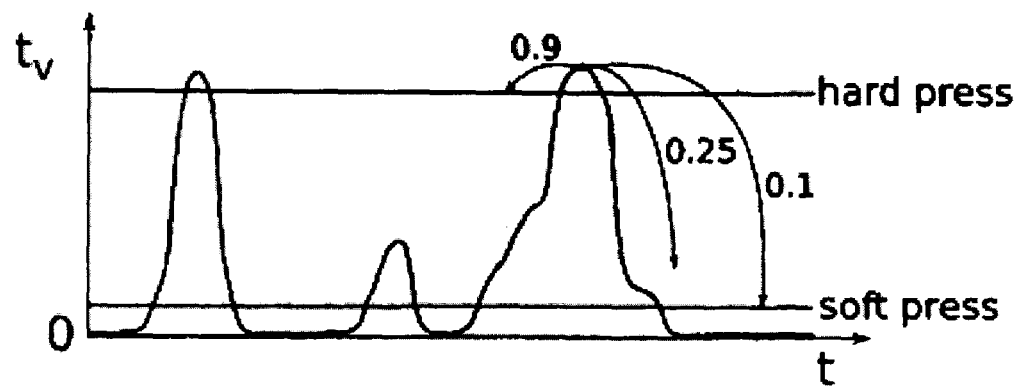
FIG. 15 illustrates a course of the frequency of the RC oscillator.

The pressure-sensitive tip replaces the standard primary mouse button. The intensity of force applied on the tip button 92 cone, hereinafter "press", is divided into several levels (soft press, medium press, and hard press). FIG. 12 illustrates each step of the F6 pressure-sensitive tip function. FIG. 15 illustrates an example of press intensity classification.

Figure 16:
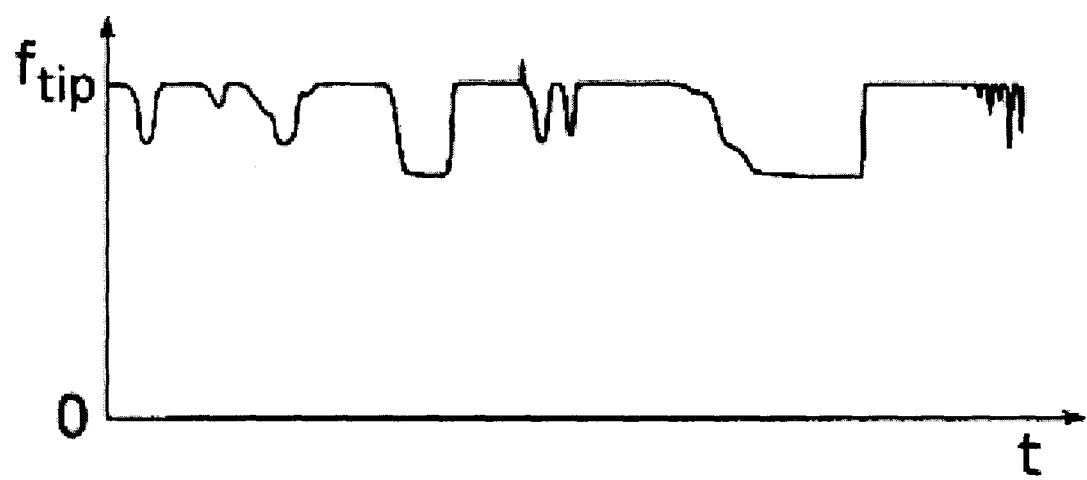
FIG. 16 illustrates a course of the frequency of the RC oscillator.

Soft press—detection of contact with the detected surface 18
Medium press—click threshold Hard press—double-click threshold The RC oscillator 94 of the capacitive sensor 91 oscillates at a relatively stable frequency and detuning (frequency drop) up to about 20% occurs due to change of the press (intensity of the force applied to the tip button 92 cone). The requests for distinguishing the tip sensor require safe recognition of a 1% change in the frequency due to a change to the press. FIG. 16 shows an example course of the frequency of the RC oscillator 94.

The press is evaluated by measuring the frequency in 15 ms cycles. The measured value shows some unfavourable properties and these are software offset:

The frequency may differ piece by piece (~25%).
Slow change to frequency due to temperature (~5%).
The frequency may shift permanently (~10%) due to the aging of the press sensor.
Each time it is switched on, the RC oscillator 94 may start at a slightly different frequency (~1%).
The frequency measurement of the RC oscillator 94 is deviated (~10%), usually upwards, with about 1:1,000 likelihood.

The frequency from the RC oscillator 94 is filtered by a frame filter to discard instability. The last four measurements are stored in the buffer. Any measurement significantly different from the others is attenuated. This eliminates single measurement errors. On the contrary, the change in the frequency caused by pressing on the tip button 92 cone will not occur and discard within 15 ms.

The RC oscillator 94 frequency is further processed:

$$t_v = \frac{f_0 - f}{f_0},$$

where
$t_v$ is information processed from the capacitive sensor 91. This is a dimensionless quantity, a number in the range from 0 (no press) up to 0.2 (maximum press)
f is the current frequency of the RC oscillator 94 after frame filter filtration
$f_0$ is the estimated maximum frequency of the RC oscillator 94
$f_0$ is computed from f using the first order IIR filter with different time constants for signal increase and decrease.

For $f_0 < f$:

$$f_0(n) = 0.9 \cdot f_0(n-1) + 0.1 \cdot f(n).$$

For $f_0 \not\cong f$:

$$f_0(n)=0.9998 \cdot f_0(n-1)+0.0002 \cdot f(n).$$

The filter is configured that $f_0$ quickly adapts to the frequency of the RC oscillator 94 after the pen is switched on. On the contrary, when f decreases, the estimated maximum frequency is decreased by about 1% in 1 second. This is sufficient to monitor the temperature drift of the RC oscillator 94.

The press level evaluation is used for the following functions:
1. The F1 optical motion function uses the press to derive the sending of the primary button mouse click (medium press level) or the primary button mouse double-click (hard press level).
2. For the F2 3D motion, F3 3D Scrolling, and F4 rolling motion functions, the press level over the medium press causes the F1 optical motion function to be enabled immediately.
3. The positioning is temporarily attenuated based on the press in the F1 optical motion function (sending the position in the HID report). When the tip button cone 92 is pressed, a slight approximation to the detected surface 18 occurs, whereby non-zero $\Delta x$ $\Delta y$ information is received from the optical sensor 13 despite that the cone did not move on the detected surface 18. As a result, this behaviour would prevent any clicking because the cursor would immediately jump aside before clicking. Therefore, positioning ceases at the moment of pressing on the tip button 92 cone, and positioning is resumed after 300 ms.

CO1 Rotation Offset for Optical Motion

The matrix R offsets rotation along the longitudinal pen axis during positioning. The accelerometer gyroscope module 242 measures gravitational acceleration for determination of the rotation:

$$\vec{a} = \begin{bmatrix} a_x \\ a_y \\ a_z \end{bmatrix},$$

In fact, the offset matrix performs the rotation operation:

$$R = \begin{bmatrix} \cos(\beta) & -\sin(\beta) \\ \sin(\beta) & \cos(\beta) \end{bmatrix} = \frac{1}{|\vec{a}|} \begin{bmatrix} a_y & -a_x \\ a_x & a_y \end{bmatrix},$$

where $\vec{a}$ is the standard for the gravitational acceleration $$|\vec{a}| = \sqrt{a_x^2 + a_y^2 + a_z^3}.$$

The matrix rotation offset R is only used provided that the following condition has been met:

$$\left| \frac{a_z}{|\vec{a}|} \right| < 0.95,$$

i.e. only when the gravity vector is not parallel with the longitudinal pen axis.

CO2 Rotation Offset for 3D Motion

The pen rotation offset around the longitudinal axis based on gravity vector a measured by the accelerometer gyroscope module 242:

$$G = \frac{1}{\sqrt{a_x^2 + a_y^2}} \begin{bmatrix} a_x & a_y \\ a_y & -a_x \end{bmatrix},$$

SF1 Variable Intensification

Figure 17:
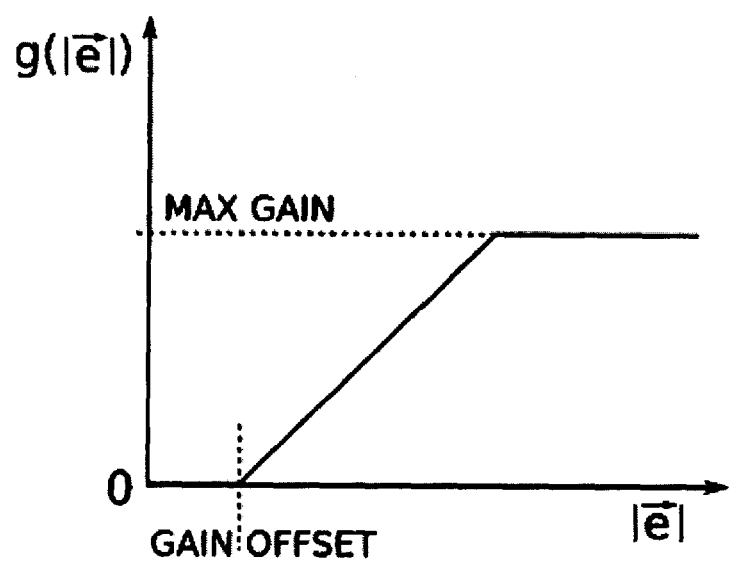
FIG. 17 illustrates an example of the course of the angular velocity in the pen longitudinal axis (Z)

A method for fully eliminating small and slow deviations. The method prevents cursor vibrations in a "steady" status (due to natural hand shakes or the accelerometer gyroscope module 242 failure). On the contrary, the cursor motion will increase in the case of rapid motion. FIG. 17 illustrates an example of the course of the angular velocity in the pen longitudinal axis (Z).

CAL1 Pressure-Sensitive Tip Calibration

Every human uses different force intensity when writing with a standard writing pen applied on the pressure-sensitive tip 9 cone ("press intensity"). The device is therefore provided with user calibration to "demonstrate" to the pen which press intensity is comfortable for the user.

Following the enabling of the calibration function, the user has 5 seconds to push the pressure-sensitive tip 9 cone several times onto the detected surface at the maximum force to be used for double-clicking. The pen detects the maximum press and derives 3 levels (and saves these in the FLASH memory):

| Name of level | Value | Use |
| --- | --- | --- |
| soft press | 0.1 * maximum | To detect contact between tip and pad |
| medium press | 0.25 * maximum | Click threshold |
| hard press | 0.9 * maximum | Double-click threshold |

CAL2 Accelerometer Gyroscope Module 242 Calibration

The offsets of the accelerometer gyroscope module 242 are provided in that the pen is left laid immobile (for about 10 seconds), N measurements are made (about 670), and the average is calculated:

$$\vec{\omega_{offset}} = \frac{1}{N} \cdot \sum_{n=0}^{N-1} \vec{\omega_S}(n),$$

Following the calibration $\vec{\omega_{offset}}$ is stored in the storage media of the pen.

CAL3 Perpendicularity Calibration

Figure 18:
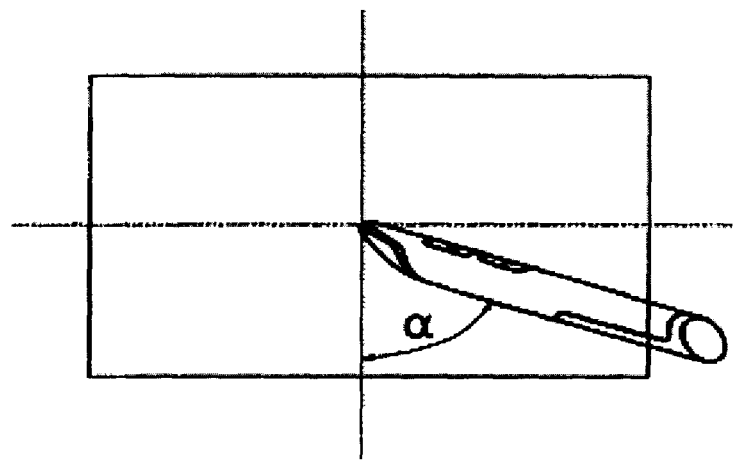
FIG. 18 illustrates the handling of a pen relative to a surface.
Figure 19:
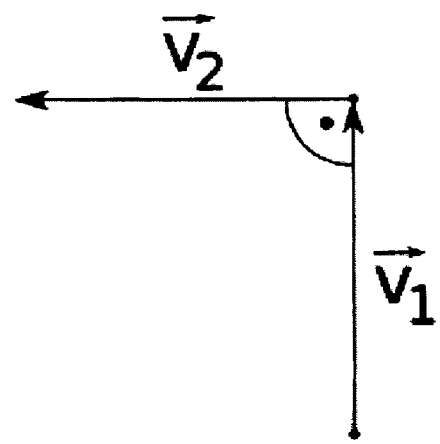
FIG. 19 illustrates two calibration vectors drawn with the pen.

The matrix A offsets the pen rotation with respect to the coordinate system of the detected surface 18. For example, there is a significant difference between left-handers and right-handers in definition of uniquely "handling" the pen as shown in FIG. 18. The calibration is based on two vectors drawn by the user (as shown in FIG. 19) with the pen:

$$\vec{v_1} = \begin{bmatrix} x_1 \\ y_1 \end{bmatrix}, \vec{v_2} = \begin{bmatrix} x_2 \\ y_2 \end{bmatrix},$$

The first vector $[\vec{v_1}]$ $\vec{v_1}$ must direct vertically upwards. The second vector $[\vec{v_2}]$ $\vec{v_2}$ goes from right to left. The described steps are checked by verifying the perpendicularity of the vectors $$\left|\frac{x_1 \cdot x_2 + y_1 \cdot y_2}{|\vec{v_1}| \cdot |\vec{v_2}|}\right| < 0.15 \approx \cos\left(\frac{3\pi}{2}\right),$$

and then by the angle orientation (which could also be i cos(.pi./2), that corresponds to {right arrow over (v.sub.2)} from left to right):

$$\frac{x_1 \cdot y_2 - y_1 \cdot x_2}{|\vec{v_1}| \cdot |\vec{v_2}|} < 1,$$

The calibration matrix A is the rotation again only:

$$A = \begin{bmatrix} \cos(\alpha) & -\sin(\alpha) \\ \sin(\alpha) & \cos(\alpha) \end{bmatrix} = \frac{1}{|\vec{v_1}|} \begin{bmatrix} x_1 & y_1 \\ -y_1 & x_1 \end{bmatrix}.$$

If no CRL3 perpendicular calibration was made, the matrix is:

$$A = \begin{bmatrix} 1 & 0 \\ 0 & 1 \end{bmatrix}$$

Figure 6:
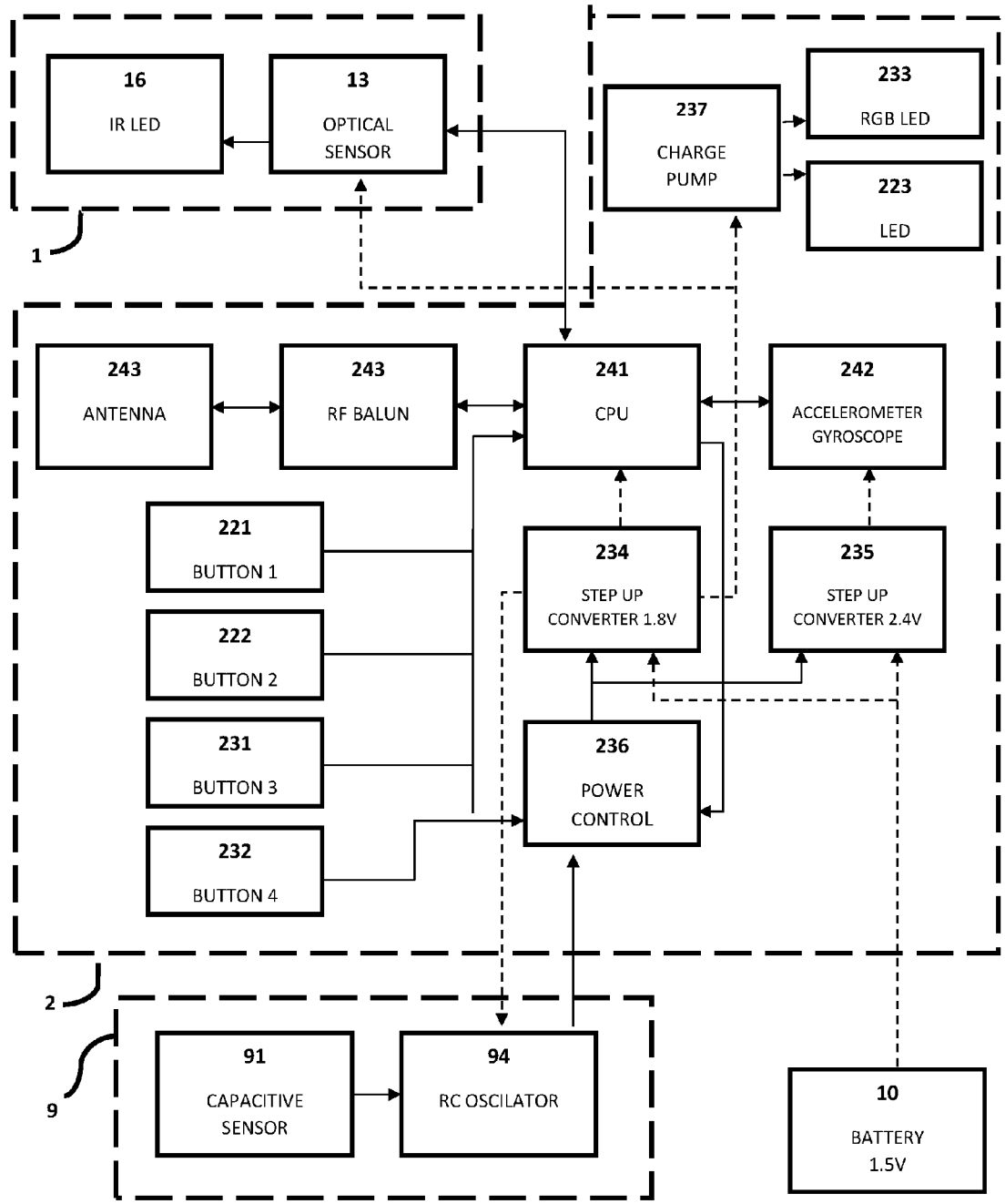
FIG. 6 illustrates the block scheme for the connection of the wireless positioning pen with the pressure-sensitive tip.
Figure 7:
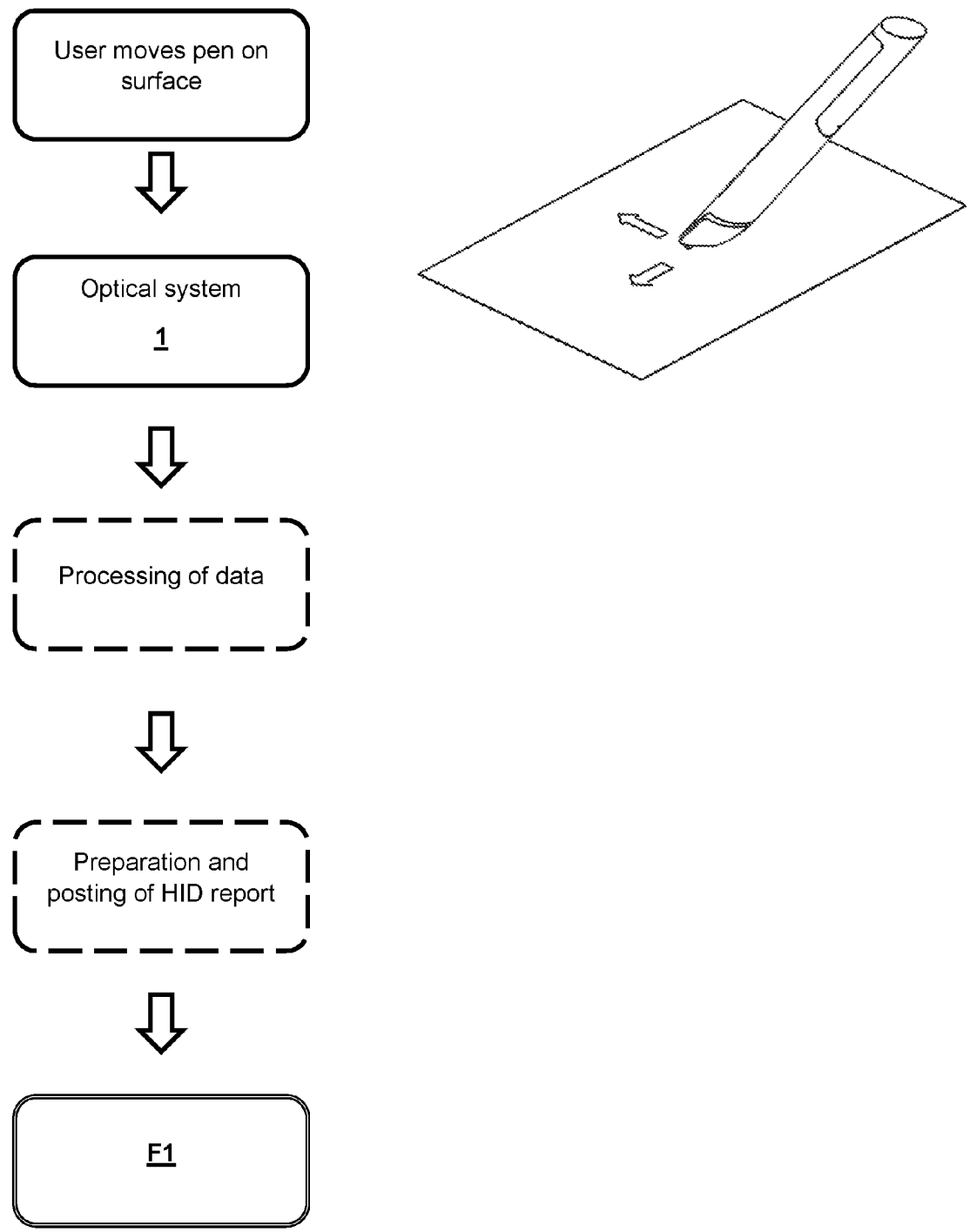
FIG. 7 illustrates the F1 function, i.e. optical X, Y axis positioning function for surface pen motion.

FIG. 6 illustrates the power and signal paths of each electronic component used for the correct function of the wireless positioning pen with the pressure-sensitive tip. The connection in this embodiment contains the optical system 1 connected to the printed circuit board (PCB) 2 and further connected with the pressure-sensitive tip 9. The optical system 1 includes the light source 16 signal-connected with the optical sensor 13. The printed circuit board (PCB) 2 includes the power manager 236 signal-connected both with the first 1.8V voltage inverter 234 as well as with the second 2.4V voltage inverter 235, wherein the power manager 236 is further signal-connected with the processor 241. The processor 241 is bi-directionally signal-connected with the accelerometer gyroscope module 242, and further bi-directionally signal-connected with the antenna 243. Signal-connected to the processor 241 are the first button 221, the second button 222, the third button 231, and the fourth button 232, wherein the button is further signal-connected to the power manager 236. The pressure-sensitive tip 9 includes the capacitive sensor 91 one-sidedly signal-connected with the RC oscillator 94 further signal-connected with the power manager 236. Powering of each electronic component with a power supply is provided by a battery 10 interconnected with both the first 1.8V voltage inverter 234 and the second 2.4V voltage inverter 235, further via the first voltage inverter 234 with the processor 241, the charge pump 237, the optical sensor 13, and the RC oscillator 94.

The connection function is as follows: The battery 10 (1.5V) provides voltage to the inverter 234, which increases the voltage to 1.8V and the processor 241, RC oscillator 94, optical sensor 13, and the charge pump 237 are thereby powered. The charge pump 237 transforms the voltage to 2.8V to power LED diode 223 and RGB LED diode 233. The battery 10 (1.5V) provides voltage to the inverter 235, which increases the voltage to 2.4V and the accelerometer gyroscope module 242 is thereby powered. The processor 241 bi-directionally communicates with the accelerometer gyroscope module 242, whereby it receives information about the 3D motions of the device. The capacitive sensor 91 detunes the RC oscillator 94 by the change to the capacity, and the processor 241 processes the frequency of the latter. The optical sensor 13 bi-directionally communicates with the processor 241 to obtain information about X, Y axes movement while moving the pen on the detected surface 18. The first button 221, the second button 222, the third button 231, as well as the fourth button 232 are connected to the processor 241, wherein the fourth button 232 is also connected to the power manager 236, whereby the switching on/off of the hardware pen is provided. The processor 241 and bi-directionally connected antenna 243 provide wireless connection with the target device.

INDUSTRIAL APPLICABILITY

The multi-functional pen controller for a computer according to this invention may be used for the comfortable control of computer devices.

LIST OF REFERENCE MARKS

1 optical system
111 optical lens
12 holder
13 optical sensor
14 PCB fixed part
15 PCB flexible part
16 light source
17 optical axis
18 detected surface
19 optical channel/tube
2 PCB (printed circuit board)
20 flexible part
21 first fixed part
211 capacitive sensor surface
22 second fixed part
221 first button
222 second button
223 LED diode
231 third button
232 fourth button
233 RGB LED diode
234 1.8V voltage inverter
235 2.4V voltage inverter
236 power manager
237 charge pump
241 processor
242 accelerometer gyroscope module
243 antenna
23 third fixed part
24 fourth fixed part
25 first contact
26 second contact
3 head
31 head fastening mechanism
4 body
5 first cover
51 fastening mechanism
6 casing
61 hole
7 second casing
8 fingerboard
9 pressure-sensitive tip
91 capacitive sensor
911 fixed electrode
912 mobile electrode 92 tip button
921 pressure-sensitive tip rotation axis
93 plug
94 RC oscillator
10 battery
11 fastening means
F1—X, Y axis positioning function for surface pen motion
F2—X, Y axis positioning function for spatial pen motion
F3—up and down angled pen scrolling motion function
F4—longitudinal axis pen rolling motion function
F5—X axis surface pen scrolling motion function
F6—surface pressure-sensitive tip pressing intensity sensing function
CO1—rotation offset for optical motion
CO2—rotation offset for 3D motion
SF1—variable intensification
CAL1—pressure-sensitive tip calibration
CAL2—gyroscope calibration
CAL3—perpendicular calibration

The invention claimed is:

1. A wireless positioning pen with a pressure-sensitive tip comprising
an electric power source, optical system (1), inertial sensors and Bluetooth wireless technology characterized in that a casing (6) is provided with the second casing (7) in the rear, and the top part is provided with holes (61) with fingerboards (8) with buttons;
said casing (6) provides a sliding housed body (4) with a battery (10) therein, a head (3) is attached to the front part thereof, and a first cover is (5) provided with a fastening mechanism (51) attached to lower part of the sliding housed body (4),
wherein the sliding housed body (4) houses a printed circuit board (2) comprising a first fixed part (21), a second fixed part (22), a third fixed part (23), and a fourth fixed part (24) mutually interconnected with flexible parts (20),
wherein a front of the sliding housed body (4) part is provided with the optical system (1) configured for sliding thereof on the PCB fixed part (14) bearing the optical sensor (13) connected through the PCB flexible part (15) to the fourth fixed part (24),
wherein the head (3) is provided with a tip button (92) with a light source (16), and in addition, a capacitive sensor (91),
wherein the capacitive sensor (91) comprises a fixed electrode (911) built inside the first fixed part (21) and a mobile electrode (912), and is one-sidedly signal-connected with an RC oscillator (94) that is further signal-connected to a power manager (236),
wherein applying a force on the tip button (92) transfers a force onto the mobile electrode (912).

2. A wireless positioning pen with a pressure-sensitive tip according to claim 1 characterized in that the optical system (1) comprises a holder (12) with one end configured to house the optical lenses (111), whereas the other end is configured for sliding on the fixed part (14) of a printed circuit board (PCB) (2) with an optical sensor (13).

3. A wireless positioning pen with pressure-sensitive tip according to claim 1 characterized in that the head (3) is provided with an expanding optical channel (19) with one end followed by the optical lenses (111), and the other end terminates in a free space, whereas both the optical channel (19) and optical system (1) are arranged coaxially with respect to the optical axis (17).

4. A wireless positioning pen with a pressure-sensitive tip according to claim 1 characterized in that the fingerboards (8) on the buttons are two-way.

5. A wireless positioning pen with a pressure-sensitive tip according to claim 1 characterized in that the first cover (5) is demountable with the body (4) via the fixing means (11), wherein the fixing means (11) is a screw.

6. The connection of the wireless positioning pen with a pressure-sensitive tip according to claim 1 characterized in that the optical system (1) is connected to the printed circuit board (PCB) (2) further connected to a pressure-sensitive tip (9), wherein a battery (10) supplies power through the printed circuit board (PCB) (2).

7. The connection of the wireless positioning pen with a pressure-sensitive tip according to claim 1 characterized in that the optical system (1) comprises the light source (16) bi-directionally signal-connected with the optical sensor (13).

8. The connection of the wireless positioning pen with a pressure-sensitive tip according to claim 1 characterized in that the printed circuit board (2) includes the power manager (236) signally connected with a first voltage inverter (234) as well as a second voltage inverter (235), wherein the power manager (236) is further signally connected with a processor (241), bi-directionally signal-connected with an accelerator gyroscope module (242), further bi-directionally signal-connected with an antenna (243), and a first button (221), a second button (222), a third button (231), and a fourth button (232) are further signal-connected to the processor (241), wherein the fourth button is further signal-connected to the power manager (236).

9. The connection of the wireless positioning pen with a pressure-sensitive tip according to claim 1 characterized in that the powering of each electronic component is provided with the battery (10) interconnected with both a first voltage inverter (234) and a second voltage inverter (235), further via a first voltage inverter (234) with a processor (241), a charge pump (237), the optical sensor (13), and the RC oscillator (94).

10. A method of controlling the wireless positioning pen with a pressure-sensitive tip comprising a power source, optical system (1), inertial sensors and Bluetooth wireless technology according to claim 1 characterized in that it comprises:
motion detection of the wireless positioning pen with a pressure-sensitive tip; and
a change in the position of a cursor of a target controlled device depending on the detected motion; or
evaluation of a screen of the target controlled device depending on the detected motion.

11. A method of controlling the wireless positioning pen with a pressure-sensitive tip according to claim 10 characterized in that tilting motions of the wireless positioning pen with the press sensitive tip vertically translates the motions to a Y axis motion movement of the cursor of the target controlled devices, and tilting horizontally translates the motions to a X axis motion movement of the cursor for the target controlled devices.

12. A method of controlling the wireless positioning pen with a pressure-sensitive tip according to claim 10 characterized in that the tilting motions of the wireless positioning pen vertically scroll the screen of the target controlled device in a direction opposite to the motion of the wireless positioning pen.

13. A method of controlling the wireless positioning pen with a pressure-sensitive tip according to claim 10 characterized in that a rapid rotation motion of the wireless positioning pen around a longitudinal axis to one side and back followed by a rolling of the wireless positioning pen in a longitudinal axis makes the screen of the target controlled device move in a direction identical to the rolling of the wireless positioning pen.

\* \* \* \* \*